(12) United States Patent
Fitzgerald

(10) Patent No.: US 10,119,456 B2
(45) Date of Patent: Nov. 6, 2018

(54) DUCTED COMBUSTION SYSTEMS UTILIZING FLOW FIELD PREPARATION

(71) Applicant: Caterpillar Inc., Peoria, IL (US)

(72) Inventor: Russell P. Fitzgerald, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/402,811

(22) Filed: Jan. 10, 2017

(65) Prior Publication Data
US 2018/0195430 A1   Jul. 12, 2018

(51) Int. Cl.
*F02B 23/00* (2006.01)
*F02F 1/24* (2006.01)
*F02M 57/04* (2006.01)
*F02M 61/18* (2006.01)
*F02D 41/30* (2006.01)

(52) U.S. Cl.
CPC .......... *F02B 23/00* (2013.01); *F02D 41/3005* (2013.01); *F02F 1/242* (2013.01); *F02M 57/04* (2013.01); *F02M 61/1806* (2013.01)

(58) Field of Classification Search
CPC ..... F02D 41/30; F02D 41/3005; F02M 55/00; F02M 55/008; F02M 57/04; F02M 61/14; F02M 61/18; F02M 61/1806; F02M 61/1813; F02M 61/1833; F02M 61/182; F02B 23/00; F02B 23/02; F02B 3/00; F02F 1/242; F02F 3/24
USPC .......................................... 123/294–300, 305
See application file for complete search history.

(56) References Cited

U.S. PATENT DOCUMENTS

| | | | |
|---|---|---|---|
| 1,260,408 A * | 3/1918 | Leissner | F02B 3/06 123/251 |
| 3,980,056 A | 9/1976 | Kraus | |
| 5,029,563 A | 7/1991 | Hu | |
| 5,224,458 A * | 7/1993 | Okada | F02M 67/12 123/432 |
| 7,987,830 B2 * | 8/2011 | Kim | F01L 1/02 123/193.5 |
| 8,967,129 B2 | 3/2015 | Mueller | |
| 2002/0020173 A1 * | 2/2002 | Varney | F23C 6/047 60/737 |
| 2005/0011965 A1 | 1/2005 | Casey | |

(Continued)

FOREIGN PATENT DOCUMENTS

GB    383993 A    12/1932
JP    3978735 B2    9/2007

*Primary Examiner* — John Kwon
*Assistant Examiner* — Johnny H Hoang
(74) *Attorney, Agent, or Firm* — Miller, Matthias & Hull

(57) ABSTRACT

A ducted combustion system includes a combustion chamber and a fuel injector in fluid connection with the combustion chamber, which includes an orifice opening from an injector tip of the fuel injector, the orifice injecting fuel into the combustion chamber as a fuel jet, the fuel jet flowing, within the combustion chamber, in a fuel flow direction. The system includes at least one duct disposed within the combustion chamber, the at least one duct being disposed such that the fuel jet, at least partially, enters one of the at least one ducts upon being injected into the combustion chamber. The at least one duct may be configured for having a flow field air stream within the duct, prior to entrance of the fuel jet, the flow field air stream having a flow direction that is substantially similar to the fuel flow direction.

18 Claims, 8 Drawing Sheets

(56) References Cited

U.S. PATENT DOCUMENTS

| | | | |
|---|---|---|---|
| 2005/0217639 A1* | 10/2005 | Hill | F02B 23/0651 |
| | | | 123/298 |
| 2007/0089427 A1* | 4/2007 | Scarinci | F23R 3/286 |
| | | | 60/776 |
| 2016/0169086 A1 | 6/2016 | Svensson | |
| 2016/0298531 A1* | 10/2016 | Anders | F02B 23/00 |
| 2016/0298583 A1* | 10/2016 | Anders | F02M 55/00 |
| 2016/0298584 A1 | 10/2016 | Svensson et al. | |
| 2017/0089310 A1* | 3/2017 | Svensson | F02M 55/00 |

* cited by examiner

DUCTED COMBUSTION SYSTEMS UTILIZING FLOW FIELD PREPARATION

STATEMENT OF GOVERNMENT INTEREST

This invention was made under a CRADA/PTS (CRADA No. SC16/01875.00.00 and PTS No. 1875.01.00) between Caterpillar, Inc. and Sandia National Laboratories, operating for the United States Department of Energy. The Government has certain rights in this invention.

TECHNICAL FIELD

The present disclosure generally relates to internal combustion engines and, more particularly, relates to ducted combustion systems for internal combustion engines.

BACKGROUND

Modern combustion engines may include one or more cylinders as part of the engine. The cylinder and an associated piston may define a combustion chamber therebetween. Within the combustion chamber, fuel for combustion is directly injected into the combustion chamber by, for example, a fuel injector, which is associated with the cylinder and has an orifice disposed such that it can directly inject fuel into the combustion chamber.

Different mixtures and/or equivalence ratios of the fuel/air mixture within the fuel jet may produce different results during combustion. The manners in which the injected fuel mixes and/or interacts with the air and other environmental elements of the combustion chamber may impact combustion processes and associated emissions. Further, if the fuel and air mixing is inadequate, then suboptimal or abnormally large amounts of soot may form within the combustion chamber.

To aid in preventing or reducing soot formation and to increase efficiency in such combustion engines, systems and methods for ducted combustion have been developed. For example, U.S. Patent Publication No. 2012/0186555 ("Ducted Combustion Chamber for Direct Injection Engines and Method") discloses ducted combustion within a combustion engine. The ducts of the '555 application generally include fins disposed around a fuel jet injected by a fuel injector. Such ducts may form a passageway corresponding to an orifice of the fuel injector, into which fuel jets are injected. The fuel jets may be channeled into the ducts, which may improve fuel combustion because upstream regions of a direct-injected fuel jet may be affected by faster and more uniform mixing as well as by an inhibition or reduction of entrainment of combustion products from downstream regions of the same or neighboring jets.

While the teachings of the '555 application are advantageous in providing an improved fuel/air mixture, further improvements in flame lift off length may be desired, as an increased flame lift off length within the chamber may reduce soot accumulation therein. Therefore, systems and methods for ducted combustion that include flow field preparation and generation, within the duct, for extending flame lift off length, are desired.

SUMMARY

In accordance with one aspect of the disclosure, a ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector in fluid connection with the combustion chamber and including at least one orifice opening from an injector tip of the fuel injector, the at least one orifice injecting fuel into the combustion chamber as at least one fuel jet, the at least one fuel jet flowing, within the combustion chamber, in a fuel flow direction. The system may further include at least one duct disposed within the combustion chamber between the flame deck surface and the piston top surface, the at least one duct being disposed such that at least one fuel jet, at least partially, enters one of the at least one duct upon being injected into the combustion chamber. The at least one duct may be configured for having a flow field air stream within the duct, prior to entrance of the at least one fuel jet, the flow field air stream having a flow direction that is substantially similar to the fuel flow direction.

In accordance with another aspect of the disclosure, an internal combustion engine is disclosed. The internal combustion engine may include an engine block having at least one cylinder bore. The internal combustion engine may further include a cylinder head having a flame deck surface disposed at one end of the cylinder bore. The internal combustion engine may further include a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface. The internal combustion engine may further include a fuel injector in fluid connection with the combustion chamber and including at least one orifice opening from an injector tip of the fuel injector, the at least one orifice injecting fuel into the combustion chamber as at least one fuel jet, the at least one fuel jet flowing, within the combustion chamber, in a fuel flow direction. The internal combustion engine may further include at least one duct disposed within the combustion chamber between the flame deck surface and the piston top surface, the at least one duct being disposed such that at least one fuel jet, at least partially, enters one of the at least one duct upon being injected into the combustion chamber. The at least one duct may be configured for having a flow field air stream within the duct, prior to entrance of the at least one fuel jet, the flow field air stream having a flow direction that is substantially similar to the fuel flow direction.

In accordance with yet another aspect of the disclosure, a method for operating a combustion system is disclosed. The method may include generating a flow field air stream in a duct, the duct disposed within a combustion chamber of an internal combustion engine, the combustion chamber defined as an enclosure bound at a first end by a flame deck of a cylinder of the internal combustion engine and bound at a second end by a piston top surface of a piston disposed within the internal combustion engine, the flow field air stream having a flow direction. The method may further include injecting a fuel jet into the combustion chamber and directing the fuel jet, at least partially, into the duct, the fuel jet flowing, within the combustion chamber, in a fuel flow direction that is substantially similar to the flow direction.

Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
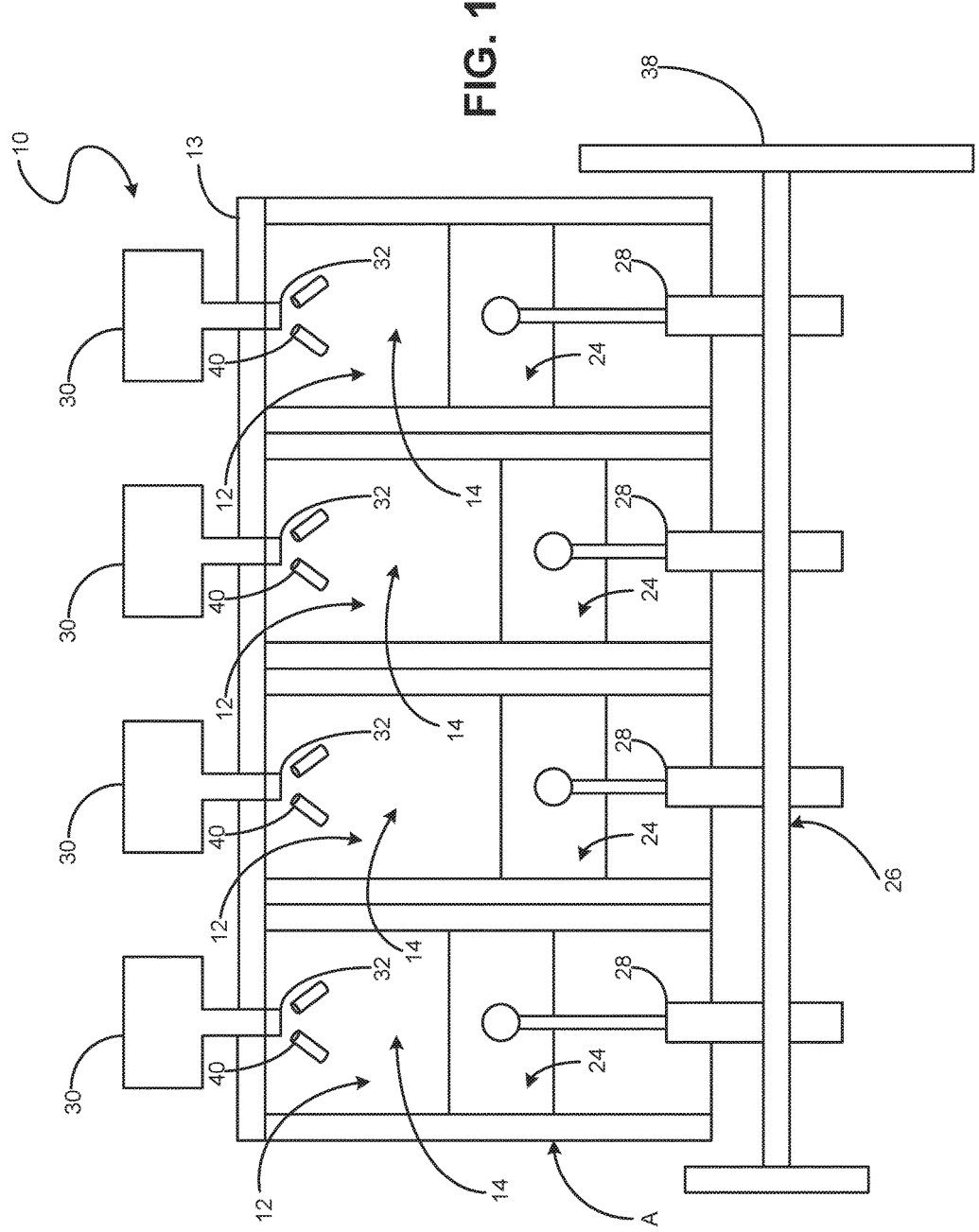
FIG. 1 is a side cross-sectional view of an internal combustion engine, in accordance with an embodiment of the present disclosure.

Turning now to the drawings and with specific reference to FIG. 1, a combustion engine 10 is shown. The engine 10 may be an internal combustion engine having a plurality of cylinders 12. For example, the cylinders 12 may be defined as cylinder bores within an engine block 13 of the engine 10. Each of the plurality of cylinders 12 includes a combustion chamber 14. Each combustion chamber 14 may have a generally cylindrical shape, in accordance with the general shape of the cylinder 12.

Figure 2:
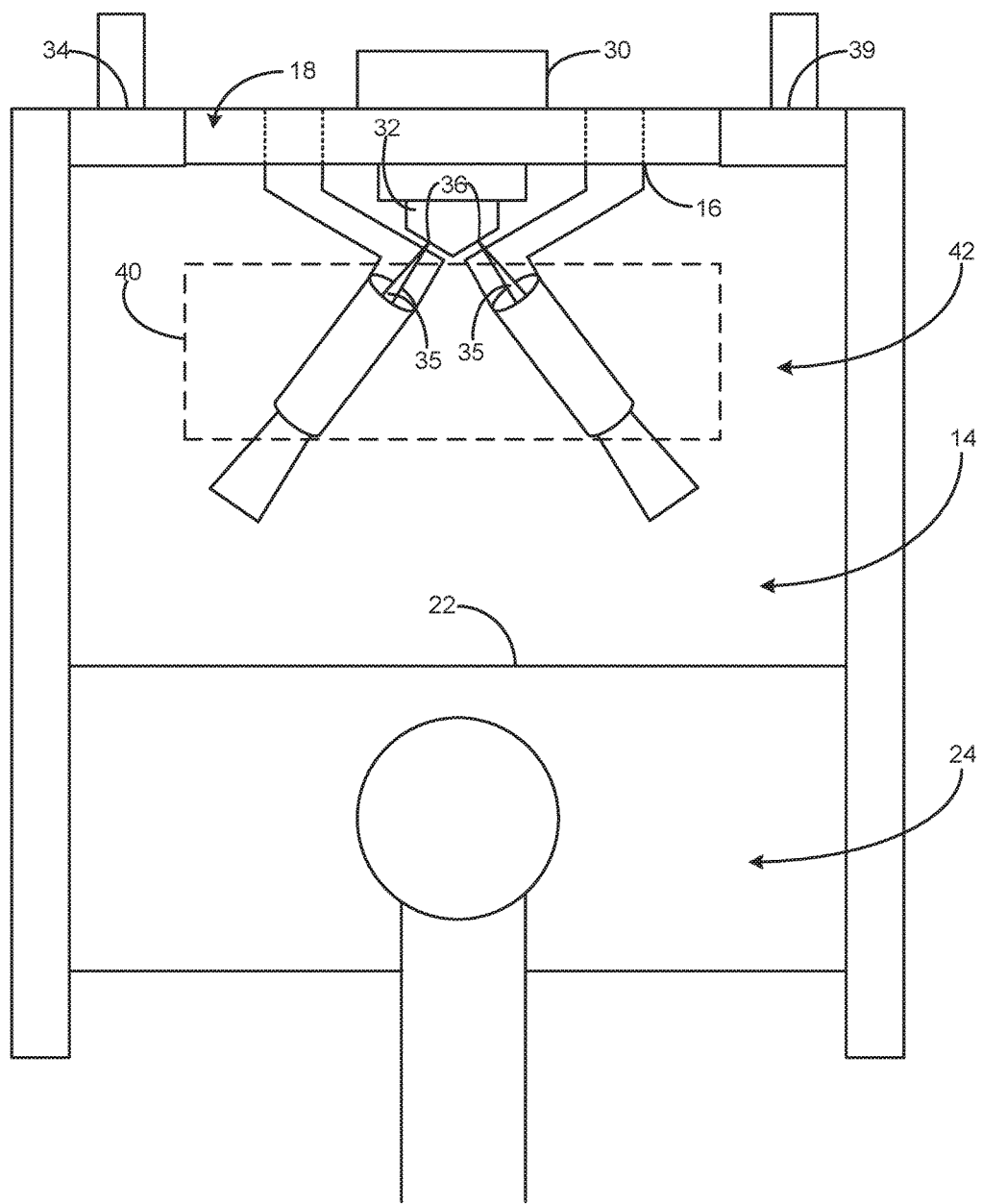
FIG. 2 is a front, cross-sectional view of a cylinder of the internal combustion engine of FIG. 1, as shown taken from the reference notation "A" of FIG. 1, in accordance with the present disclosure.

The combustion chamber 14 is shown in greater detail in the front, cross-sectional view of FIG. 2. As shown in FIG. 2, and with continued reference to FIG. 1, the combustion chamber 14 may be bound at one end by a flame deck surface 16 of a cylinder head 18 of each cylinder 12. The combustion chamber 14 may be further bound at a second end by a piston top surface 22 of a piston 24. The piston 24 is reciprocally disposed within the bore and, as shown in FIG. 1, is connected to a crankshaft 26 via a connecting rod 28. A fuel injector 30 is in fluid connection with the combustion chamber 14 and may be mounted in the cylinder head 18. The fuel injector 30 includes a tip 32 that protrudes within the combustion chamber 14 through the flame deck surface 16. Therefore, the fuel injector 30, via the tip 32, can directly inject fuel into the combustion chamber 14 as, for example, one or more fuel jets. Said one or more fuel jets may be injected, by the fuel injector 30, in a fuel flow direction, as discussed in more detail below.

During operation of the engine 10, air enters the combustion chamber 14 via one or more air intake valves 34 (shown in FIG. 2). Air is able to enter the combustion chamber 14 when the air intake valves 34 are open during an intake stroke and/or at the end of an exhaust stroke and/or at the beginning of a compression stroke. When air is present in the combustion chamber 14, the fuel injector 30, via the tip 32, will inject high pressure fuel through orifices 36 of the tip 32 as fuel jets 35. The fuel jets 35 may generally disperse within the combustion chamber 14 to create a fuel/air mixture within the combustion chamber 14. Ignition produces combustion, which, in turn, provides work on the piston 24 to produce motion upon the crankshaft 26 to drive an output 38. Following combustion, exhaust gas may be expelled from the combustion chamber 14 via one or more exhaust valves 39, when said exhaust valves 39 may be open during an exhaust stroke and/or at the end of a power stroke and/or at the beginning of an intake stroke of the engine 10.

Within the combustion chamber 14, uniformity of fuel/air mixture may be relevant to the combustion efficiency and may be relevant to the amount and type of combustion byproducts that are formed. For example, if the fuel/air mixture is too rich in fuel due to insufficient mixing within the combustion chamber 14, then higher soot emissions may occur within the combustion chamber 14 and/or combustion efficiency may be affected. However, using one or more ducts 40 disposed within the combustion chamber 14 may provide for more uniform fuel/air mixing within the fuel jets 35. Using such, the one or more ducts 40, a lift-off length of a flame associated with a fuel jet 35 may be altered (extended or reduced) to achieve an optimized lift-off length. The one or more ducts 40 may alter lift-off length due to energy exchange between the one or more ducts 40 and the fuel/air mixture of the fuel jet 35, due to altering fluid dynamics of the fuel/air mixture of the fuel jet 35, and/or due to prevention of lift-off length recession by acting as a flame arrester. Additionally, potential lift-off length recession of a flame may be prevented by shielding each fuel jet 35 from adjacent fuel jet(s) 35, due to usage of the ducts 40.

The one or more ducts 40 may be disposed within a flame region 42 of the combustion chamber 14. The flame region 42 may be defined as a region of the combustion chamber 14 extending from the flame deck surface 16 to the piston top surface 22, when the piston 24 is at or close to a maximum compression distance or top dead center (TDC) position.

Figure 3:
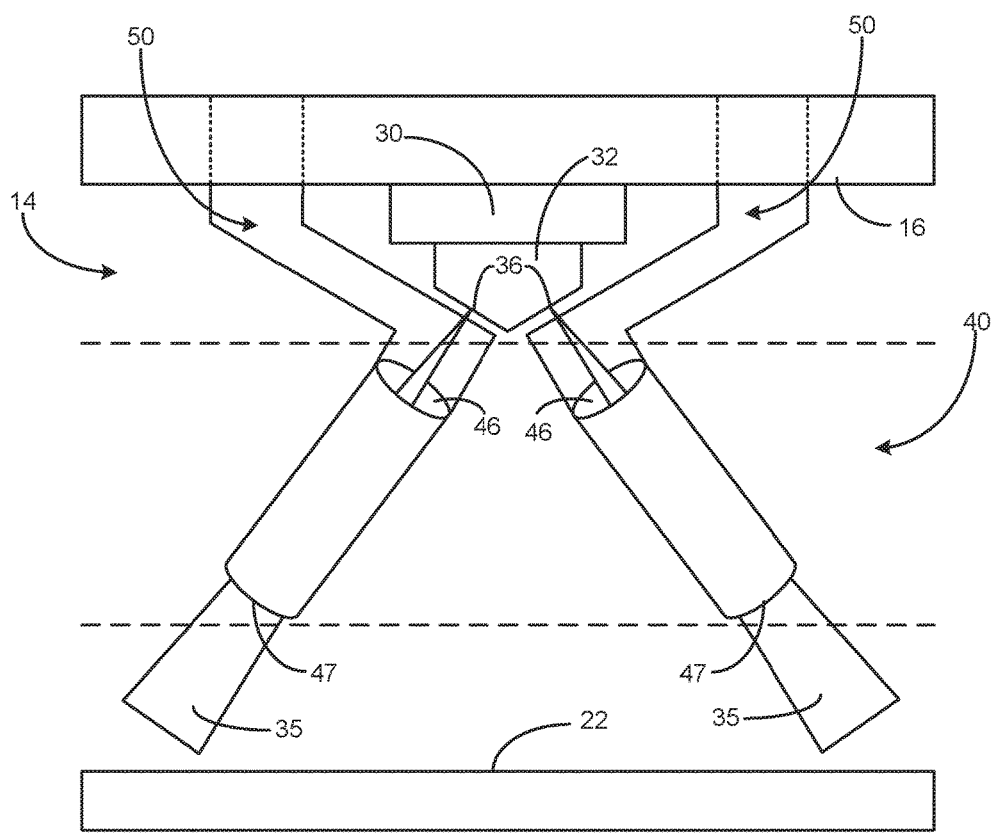
FIG. 3 is a side view of ducts for use within the cylinder(s) of FIGS. 1 and 2, in accordance with an embodiment of the disclosure.

To further illustrate the one or more ducts 40 and their interaction with one or more fuel jets 35 injected from the one or more orifices 36 of the tip 32 of the fuel injector 30, the ducts 40, within the combustion chamber 14, are shown in greater detail in FIG. 3. While the one or more ducts 40 are shown herein as generally tubular shaped structures, the one or more ducts 40 may be any plurality of structures or single structures defining any shape of duct with which the one or more fuel jets 35 may pass through upon injection. Upon being injected out of the one or more orifices 36, the fuel jets 35 may, at least partially, enter the ducts 40 at duct openings 46 and may, at least partially, flow through the ducts 40 to duct outlets 47. In some examples, the ducts 40 may be positioned and/or supported within the combustion chamber 14 by a support structure. The support structure may be any mounting, wiring, or other positioning device suitable for positioning the ducts 40 within the combustion chamber 14. As shown, the ducts 40 may be supported by structural elements of an airflow channel 50, which may act as a support structure for the ducts 40; however, the ducts 40 are certainly not limited to being supported by the airflow channel 50 nor does the airflow channel 50 necessarily need to structurally support the ducts 40.

Use of the ducts 40 may provide improved mixing of a fuel/air mixture within the fuel jets 35. The ducts 40 may direct combustion away from the fuel injector 30, such that longer flame lift-off lengths may be achieved. Further, by channeling the fuel jets 35 into the ducts 40 may inhibit or reduce entrainment of combustion products from downstream regions of the same or neighboring fuel jets 35. By using such ducts 40, levels of soot within the combustion chamber 14, which often result from inadequate fuel/air mixtures and/or improper flame lift off length, may be reduced greatly.

Figure 4A:
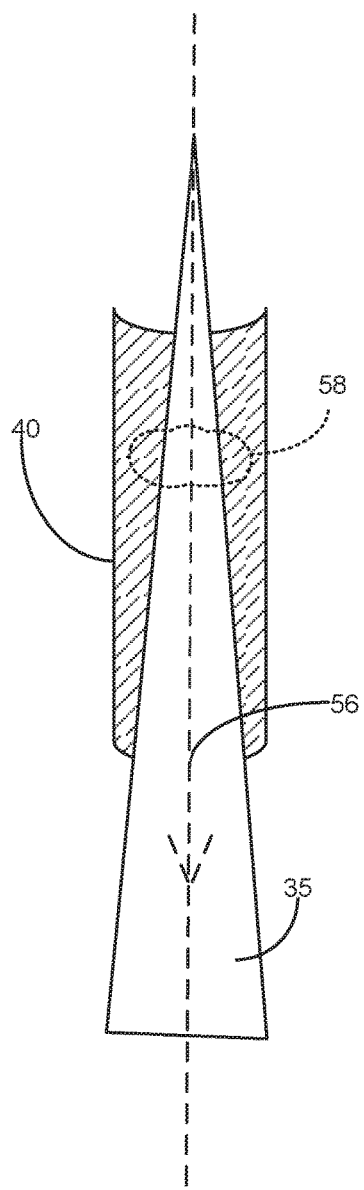
FIG. 4A is a cross-sectional side view of a duct for use in a ducted combustion system, showing interaction of a fuel jet with stagnant air within the duct, in view of prior art ducted combustion systems.
Figure 4B:
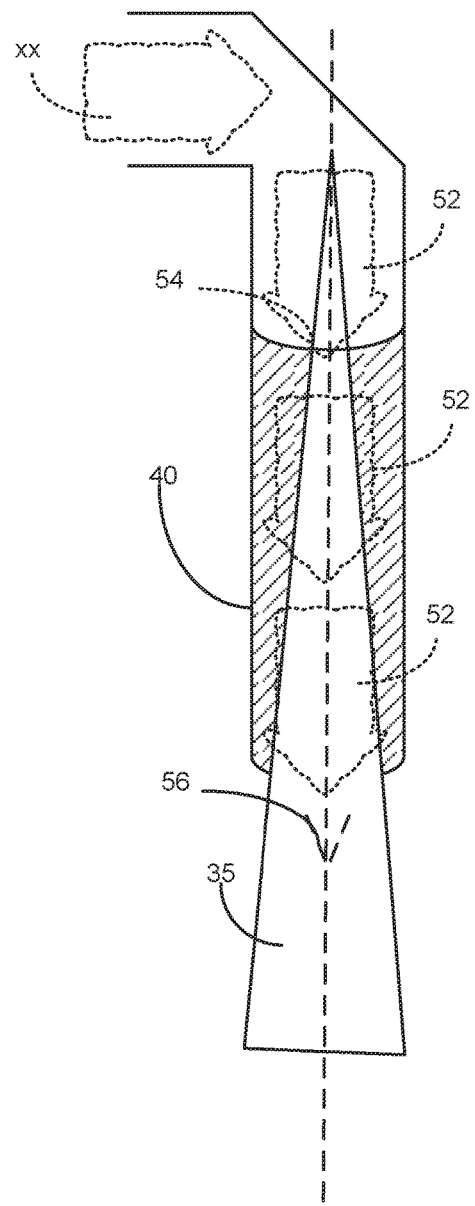
FIG. 4B is a cross-sectional side view of one of the ducts of FIG. 3, configured to have a flow field within the duct, during operation, showing interaction of a fuel jet with the flow field, in accordance with FIGS. 1-3 and the present disclosure.

To further improve flame lift-off length by improving the speed at which the one or more fuel jets 35 travel through the ducts 40, the ducts 40 may be configured to utilize a flow field air stream 52 within the ducts 40, as depicted in the cross sectional view of one of the ducts 40 in FIG. 4B. The flow field air stream 52 may be any air or airflow that flows in a substantially similar direction, a flow direction 54, to the flow direction of the injected fuel jet 35, a fuel flow direction 56. The flow field air stream 52 may enter or exist within the duct 40 prior to injection of the one or more fuel jets 35. Elements of the figures that are intended to visualize "air" or "airflow," which, in a practical sense, are invisible, are denoted in the figures using dotted lines.

By utilizing the flow field air stream 52 during ducted combustion, fuel injection velocity and/or momentum, of the fuel jet 35, may be maintained, from injection speeds, and/or such velocity and/or momentum may be improved, versus ducted combustion systems that do not utilize any flow field generation or preparation. As a product of increasing or maintaining velocity and/or momentum of the fuel jet 35, as it travels through the duct 40, flame lift-off length may be extended, which, in turn, may lead to even greater soot reduction, in comparison to prior, flow field absent, ducted combustion.

For example, FIG. 4A shows an example, prior art duct having a fuel jet 35 injected therein. However, as there is no flow field in the prior art duct of FIG. 4A, an air plug 58 may exist within the prior art duct, prior to or during injection of the fuel jet 35. The air plug 58 may be any practically static and/or stagnant air within a duct that may form a gaseous barrier to unencumbered injection of the fuel jet 35, through the duct. Accordingly, the existence of the air plug 58, or any similar, stagnant, gaseous clusters, may slow the core velocity and/or momentum of the fuel jet 35, as it is injected into the duct. Accordingly, barriers, such as the air plug 58, may be avoided by utilizing the flow field air stream 52, as the flow field air stream 52 may clear out the duct 40 of stagnant gaseous clusters prior to or during fuel injection. Therefore, with such barriers, at least in part, removed from the duct 40, velocity and/or momentum of the fuel jet 35 may be increased, with respect to prior art ducts such as that of FIG. 4A, leading to improvements in flame lift-off length, and, ultimately, even greater reduction of net soot production in the combustion chamber 14.

Accordingly, for producing the flow field air stream 52, the ducts 40 may be associated with the airflow channel 50, which may be configured to provide the flow field air stream 52 within the duct 40. The airflow channel 50, as shown, may be configured to direct the air in the flow direction 54. In some examples, the airflow channel 50 may be configured to receive air from an outside source, which may be any air source independent of the immediate combustion chamber 14. Air, as defined herein, may be any combination of oxygen-containing gases and other airborne products, such as combustion products. In some examples, the outside air may have a cooler temperature, which, in some examples, may aid in cooling within and/or in the proximity of the ducts 40. The airflow channel 50 may then flow said air from an outside source into the combustion chamber 14 and into at least one of the one or more ducts 40, to create the flow field air stream 52.

Figure 5:
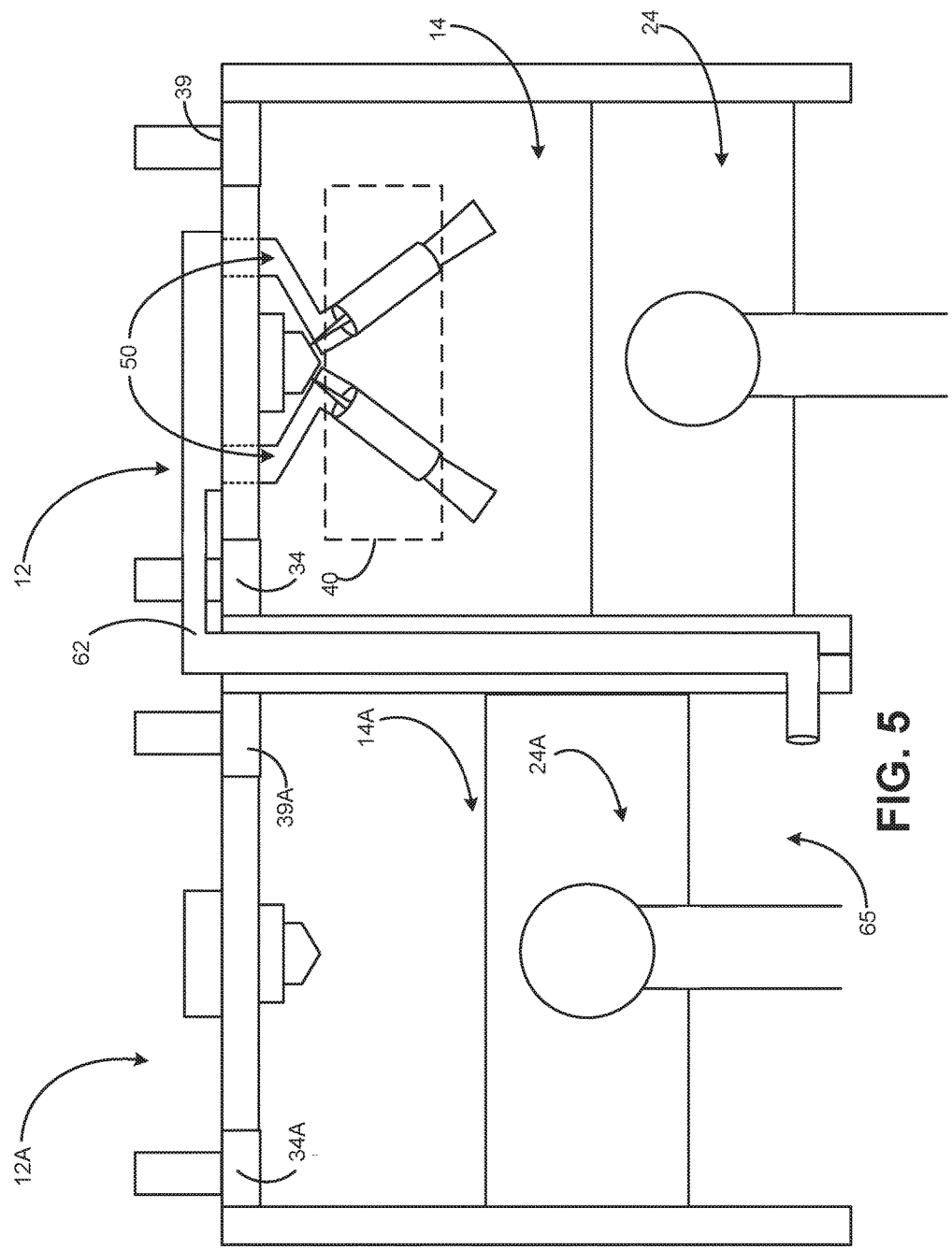
FIG. 5 is a side view of two cylinders of the internal combustion engine of FIG. 1, wherein a second cylinder provides air to a first cylinder, in accordance with an embodiment of the disclosure.

As mentioned above, the outside source from which the airflow channel 50 receives the air may be any source of air independent of the combustion chamber 14. For example, as shown in FIG. 5, the cylinder 12, in which the ducts 40 are disposed and the air injector 50 injects air, may be paired with a second cylinder 12A of the internal combustion engine 10. Similar to the first cylinder 12, the second cylinder 12A may be a cylinder bore of the engine block 13. The airflow channel 50 may be connected to the second cylinder 12A via an air conduit 62 from which the air injector 50 may draw air. In such examples, with the airflow channel 50 in fluid communication with the second cylinder 12A via the air conduit 62, air for producing the flow field air stream 52 is communicated from the second cylinder 12A to the airflow channel 50.

In some examples, the air conduit 62 may be connected to a piston cavity 65, located underneath a second piston 24A of the second cylinder 12A, wherein air enters the air conduit 62 from the piston cavity 65 and continues to flow to the airflow channel 50. In such examples, the airflow channel 50 may receive air via the air conduit 62 when the second piston 24A is in reciprocating motion. For example, when the piston 24A is in reciprocating motion, air from the piston cavity 55 may be compressed and, thus, forced into the air conduit 62 on a downward stroke of the piston 24A and, thereby, injected into the chamber 14 via the airflow channel 50.

Figure 6:
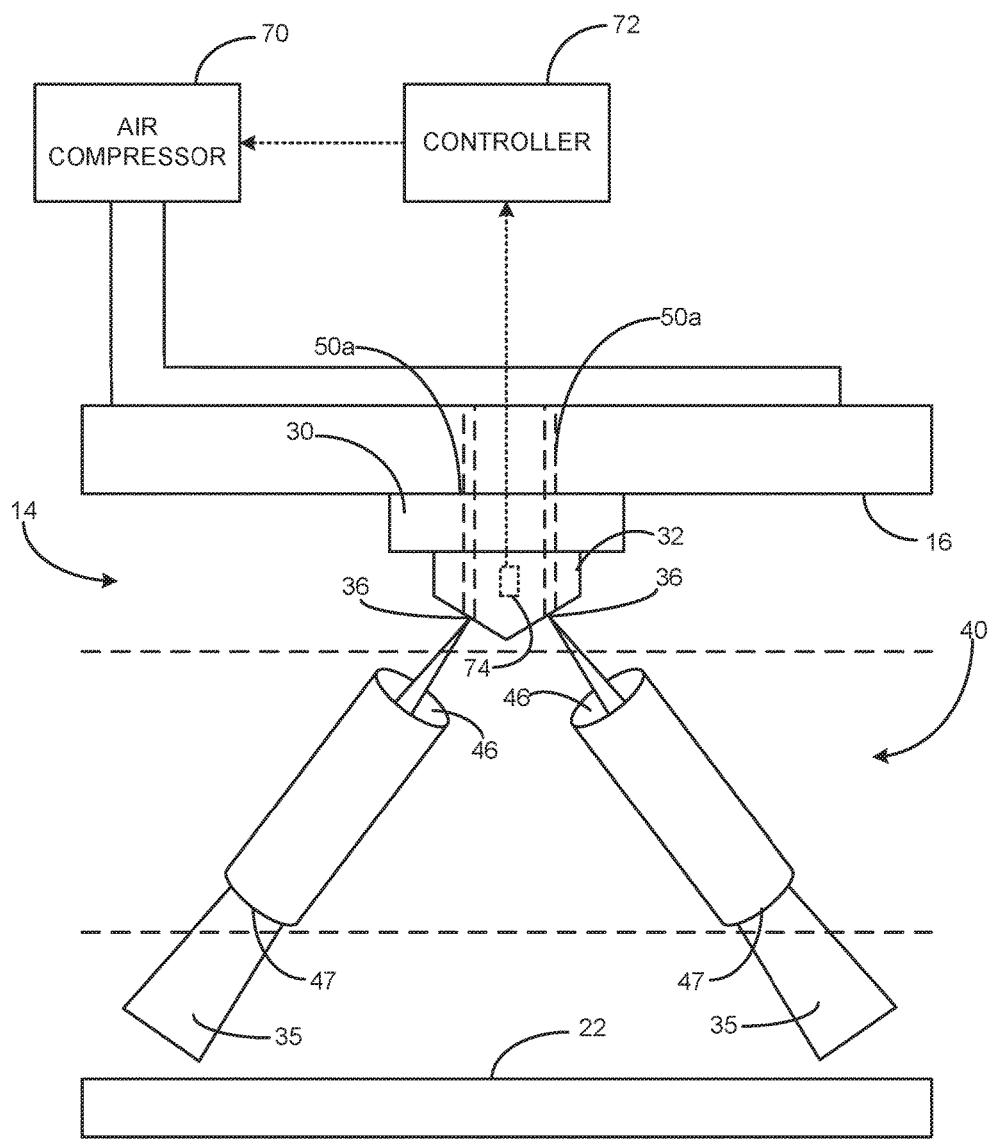
FIG. 6 is a side view of ducts for use within the cylinder(s) of FIGS. 1 and 2, wherein an airflow channel receives air from an air compressor, in accordance with an embodiment of the disclosure.

In an alternative embodiment shown in FIG. 6, the outside source of air may come from an air compressor 70 configured to generate air for the flow field air stream 52 and communicate said air to the airflow channel 50. The air compressor 70 may be any electrical or mechanical device that provides air to the airflow channel 50. Levels of outside air provided by the air compressor 70 and/or the timing of flow of said air may be controlled by a controller 72 associated with the air compressor 70 and any other elements of the internal combustion engine 10 or its cylinders 12. The controller 72 may be any electronic controller or computing system including a processor which operates to perform operations, execute control algorithms, store data, retrieve data, gather data, and/or any other computing or controlling task desired. The controller 72 may be configured to provide control signals to the air compressor 70 to control the flow of air into the combustion chamber 14 via the airflow channel 50.

In some examples, the controller 70 may be associated with a flow sensor 74. The control signals for the air compressor 70 may be determined using information provided to the controller 72 using the flow sensor 74. The information provided by the flow sensor 74 may include, but is not limited to including, flow rate of the fuel jets 35, fuel pressure output from the fuel injector 31, fuel velocity of the fuel jets 35, injection timing of one or more of the fuel jets 35, flow speed of the flow field airstream 52, existence of stagnant air relative to the ducts 40, and any other information associated with flow of air or fuel from the fuel injector 31. The controller 72 may use flow signals provided by the flow sensor 74 to determine the control signals provided to the air compressor 70 to control flow of air via the airflow channel 70.

While embodiments utilizing one or more of the elements of FIG. 6 are certainly possible utilizing airflow channels 50 similar to those shown and described with reference to FIGS. 2, 3, and 5, the embodiment of FIG. 6 shows alternative airflow channels 50a that may additionally or alternatively be used in any of the embodiments of FIGS. 2, 3, and 5. The airflow channels 50a may be integrated within the fuel injector 30, wherein sources for the fuel jets 35 and the flow field airstream 52 may each be communicated to one or more of the orifices 36. In such examples, the flow field airstream 52 may flow from the orifices 36 prior to injection of the one or more fuel jets 35.

Figure 7:
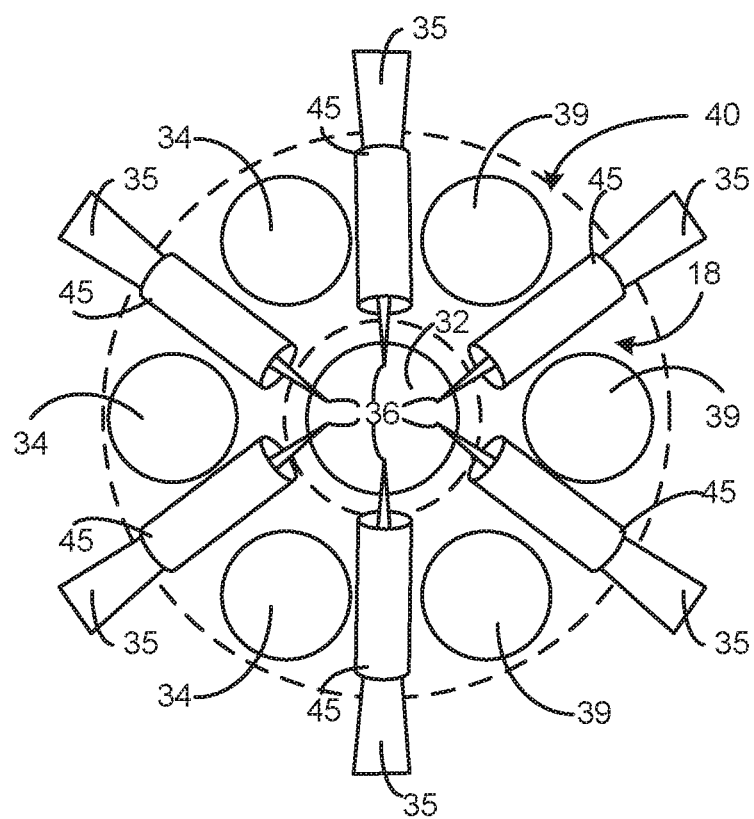
FIG. 7 is a top view of the ducts of the present disclosure, shown from above the ducts and an associated fuel injector and showing placement with relation to the intake valves and exhaust valves of FIG. 2, in accordance with an embodiment of the disclosure.

Turning now to FIG. 7 and with continued reference to FIGS. 2 and 3, an example placement configuration of the ducts 40, air intake valves 34, and exhaust valves 39 is shown. As shown in FIG. 2, the air intake valves 34 and exhaust valves 39 are disposed on the cylinder head 18. The configuration of FIG. 7 shows the air intake valves 34 and exhaust valves 39 arranged radially outward, relative to the injector tip 32 and spaced circumferentially about the cylinder head 18. The ducts 40 of the one or more ducts 40 may be disposed, circumferentially, such that each duct structure 45 is located between two valves 34, 39. In such an arrangement, there may be access for each of the ducts 40 to be mounted to the head 18 by, for example, a support structure. The valves 34, 39 may be circumferentially spaced substantially equidistant from one another; however, any spacing scheme may be used so long as a duct 40 may be disposed circumferentially between two valves 34, 39. While six ducts 40 and six valves 34, 39 are shown, any number of duct structures 45 and valves 34, 39 may be included, such that each duct 40 is disposed circumferentially between at least two valves 34, 39.

INDUSTRIAL APPLICABILITY

The present disclosure relates generally to internal combustion engines and, more specifically, to ducted combustion systems. While the present disclosure shows the embodiments as related to internal combustion engines having reciprocating pistons, the teachings of the disclosure are certainly applicable to other combustion systems, which utilize diffusion or non-premixed flames, such as gas turbines, industrial burners, and the like. As discussed above, the various arrangements of ducts and their related elements are useful in promoting a substantially uniform fuel/air mixture within combustion chambers and may inhibit or reduce entrainment of recirculated combustion products from downstream regions into upstream regions of fuel jets injected into combustion chambers. Further, using such systems and methods for ducted combustion may also improve flame-lift off length of ignited flames within said combustion chambers.

Further, utilizing flow field air streams during ducted combustion, fuel injection velocity and/or momentum, of the fuel jet, may be maintained, from injection speeds, and/or such velocity and/or momentum may be improved, versus ducted combustion that does not utilize any flow field generation or preparation. As a product of increasing or maintaining velocity and/or momentum of the fuel jet, as it travels through the duct, flame lift-off length may be extended, which, in turn, may lead to even greater soot reduction, in comparison to prior, flow field absent, ducted combustion.

Figure 8:
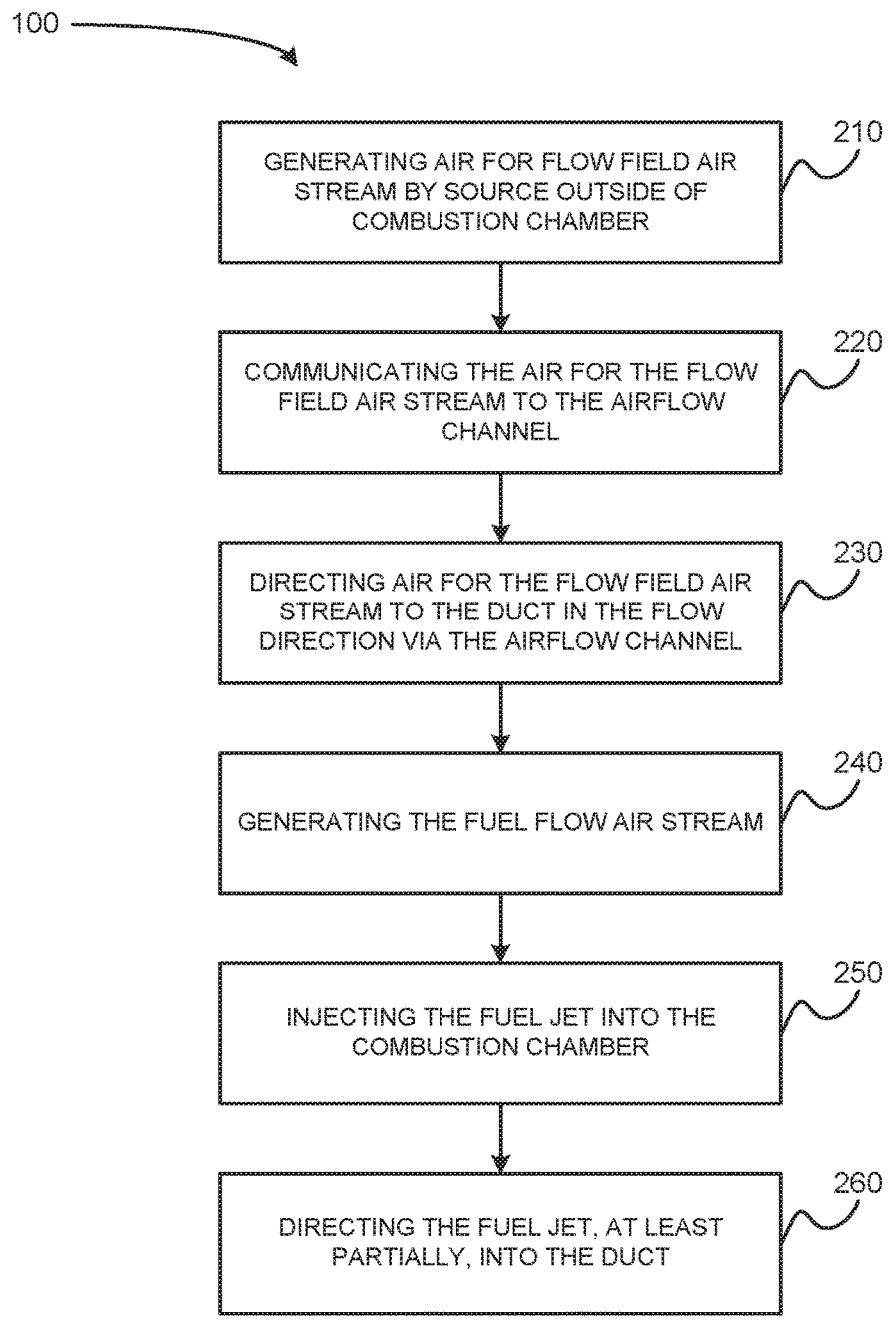
FIG. 8 is a block diagram of a flowchart representative of a method for operating a combustion system, in accordance with an embodiment of the disclosure.

An example method utilizing the ducted combustion systems shown in FIGS. 1-3, 4B, and 5-7, and described above, is exemplified in the flowchart of FIG. 8, which represents a method 100 for operating a combustion system. While reference is made to the systems described above and their respective elements and reference numerals, the method 100 certainly is not limited to being performed by the elements and/or embodiments discussed above.

The method 100 begins at block 210, wherein air for the flow field air stream 52 is generated by a source outside of the combustion chamber (e.g., the air compressor 70, the second cylinder 12A, among other things). Said air may then be communicated to the airflow channel 50, as shown in block 220. Then, the air may be directed from the flow field air stream to the duct 40, in the flow direction 54, via the airflow channel 50, as depicted in block 230. Using such air or any other air, the flow field air stream 52 may then be generated within the duct 40, as depicted in block 240.

With the flow field prepared, the method may then continue by injecting a fuel jet 35 into the combustion chamber 14 of the internal combustion engine 10, as depicted in block 250. Further, the fuel jet 35 may be directed into a duct of the one or more ducts 40, to provide a substantially uniform fuel/air mixture within the fuel jets, as shown in block 260. By utilizing the flow field air stream 52, flame lift off length may be lengthened, leading to a lessening in soot production, within the combustion chamber 14.

It will be appreciated that the present disclosure provides ducted combustion systems, internal combustion engines utilizing ducted combustion, and methods for operating combustion systems utilizing ducted combustion. While only certain embodiments have been set forth, alternatives and modifications will be apparent from the above description to those skilled in the art. These and other alternatives are considered equivalents and within the spirit and scope of this disclosure and the appended claims.

What is claimed is:

1. A ducted combustion system, comprising:
   a combustion chamber defined as an enclosure bound at a first end by a flame deck surface of a cylinder head of an internal combustion engine, and bound at a second end by a piston top surface of a piston disposed within the internal combustion engine;
   a fuel injector in fluid connection with the combustion chamber and including at least one orifice opening from an injector tip of the fuel injector, the at least one orifice injecting fuel into the combustion chamber as at least one fuel jet, the at least one fuel jet flowing, within the combustion chamber, in a fuel flow direction;
   at least one duct disposed within the combustion chamber between the flame deck surface and the piston top surface, the at least one duct being disposed such that the at least one fuel jet, at least partially, enters the at least one duct upon being injected into the combustion chamber, the at least one duct configured for having a flow field air stream within the duct, prior to entrance of the at least one fuel jet, the flow field air stream having a flow direction, the flow direction being substantially similar to the fuel flow direction; and at least one duct support structure supporting the at least one duct within the combustion chamber, the at least one duct support structure being configured to provide the flow field air stream within the duct and to direct the flow field air stream in the flow direction.

2. The ducted combustion system of claim 1, wherein the at least one duct support structure is an airflow channel.

3. The ducted combustion system of claim 2, wherein the airflow channel is in fluid communication with a second cylinder of the internal combustion engine and air for the flow field air stream is communicated from the second cylinder to the airflow channel.

4. The ducted combustion system of claim 3, wherein the air for the airflow channel is communicated from the second cylinder to the airflow channel on a downward stroke of a second piston of the second cylinder.

5. The ducted combustion system of claim 2, further comprising an air compressor in fluid communication with the airflow channel and air for the flow field air stream is generated by the air compressor and communicated to the airflow channel.

6. The ducted combustion system of claim 5, further comprising a controller, the controller associated with the air compressor and providing control signals to the air compressor to control air generation for generating the flow field air stream.

7. The ducted combustion system of claim 6, further comprising a flow sensor associated with the fuel injector, the controller using flow signals provided by the flow sensor to determine the control signals provided to the air compressor to control air generation for generating the flow field air stream.

8. The ducted combustion system of claim 1, further comprising a plurality of valves located in the cylinder head, the plurality of valves including at least one air intake valve and at least one exhaust valve, and wherein each of the at least one ducts is circumferentially disposed between two members of the plurality of valves.

9. An internal combustion engine, comprising:
an engine block including a first cylinder bore;
a cylinder head having a flame deck surface disposed at one end of the first cylinder bore;
a piston connected to a crankshaft and configured to reciprocate within the cylinder bore, the piston having a piston top surface facing the flame deck surface such that a combustion chamber is defined within the first cylinder bore bound at a first end by the flame deck surface and at a second end by the piston top surface;
a fuel injector in fluid connection with the combustion chamber and including at least one orifice opening from an injector tip of the fuel injector, the at least one orifice injecting fuel into the combustion chamber as at least one fuel jet, the at least one fuel jet flowing, within the combustion chamber, in a fuel flow direction;
at least one duct disposed within the combustion chamber between the flame deck surface and the piston top surface, the at least one duct being disposed such that the at least one fuel jet, at least partially, enters the at least one duct upon being injected into the combustion chamber, the at least one duct configured for having a flow field air stream within the duct, prior to entrance of the at least one fuel jet, the flow field air stream having a flow direction, the flow direction being substantially similar to the fuel flow direction; and at least one duct support structure supporting the at least one duct within the combustion chamber, the at least one duct support structure being configured to provide the flow field air stream within the duct and direct the flow field air stream in the flow direction.

10. The internal combustion engine of claim 9, wherein the at least one duct support structure is an airflow channel.

11. The internal combustion engine of claim 10, wherein the airflow channel is in fluid communication with a second cylinder of the internal combustion engine and air for the flow field air stream is communicated from the second cylinder to the airflow channel.

12. The internal combustion engine of claim 11, wherein the air for the airflow channel is communicated from the second cylinder to the airflow channel on a downward stroke of a second piston of the second cylinder.

13. The internal combustion engine of claim 10, further comprising an air compressor in fluid communication with the airflow channel and air for the flow field air stream is generated by the air compressor and communicated to the airflow channel.

14. The internal combustion engine of claim 13, further comprising a controller, the controller associated with the air compressor and providing control signals to the air compressor to control air generation for generating the flow field air stream.

15. The internal combustion engine of claim 14, further comprising a flow sensor associated with the fuel injector, the controller using flow signals provided by the flow sensor to determine the control signals provided to the air compressor to control air generation for generating the flow field air stream.

16. A method for operating a combustion system, comprising:
generating a flow field air stream in a duct using a duct support structure, the duct disposed within a combustion chamber of an internal combustion engine and being supported within the combustion chamber by the duct support structure, the combustion chamber defined as an enclosure bound at a first end by a flame deck of a cylinder of the internal combustion engine and bound at a second end by a piston top surface of a piston disposed within the internal combustion engine, the flow field air stream having a flow direction;
injecting a fuel jet into the combustion chamber;
directing the fuel jet, at least partially, into the duct, the fuel jet flowing, within the combustion chamber, in a fuel flow direction that is substantially similar to the flow direction.

17. The method of claim 16, wherein the duct support structure is an airflow channel and wherein the method further comprises directing air for the flow field air stream to the duct, in the flow direction, via the airflow channel.

18. The method of claim 17, further comprising:
generating air for the flow field air stream by a source outside of the combustion chamber; and
communicating the air for the flow field air stream to the airflow channel.

* * * * *

UNITED STATES PATENT AND TRADEMARK OFFICE
CERTIFICATE OF CORRECTION

Page 1 of 1

PATENT NO.           : 10,119,456 B2
APPLICATION NO.      : 15/402811
DATED                : November 6, 2018
INVENTOR(S)          : Russell P. Fitzgerald It is certified that error appears in the above-identified patent and that said Letters Patent is hereby corrected as shown below:

In the Specification

Insert the following immediately after the title at Column 1:
--Statement of Government Interest
This invention was made with government support under contract CRADA: SC16/01875.00.00 awarded by the DOE. The Government has certain rights in this invention.--

Signed and Sealed this
First Day of November, 2022

Katherine Kelly Vidal
*Director of the United States Patent and Trademark Office*